US006792719B2

United States Patent
Lawrie et al.

(10) Patent No.: US 6,792,719 B2
(45) Date of Patent: Sep. 21, 2004

(54) DIAPHRAGM SEAL FOR SEALING ELECTRICAL CONNECTORS IN A VEHICLE DOOR

(75) Inventors: Mark Graham Lawrie, Lion on Sulias (FR); Yann Le Gallo, Orleans (FR); Pascal de Vries, Sandillion (FR); Klaus B. Wilhelm Blume, Frankfurt (DE); Charles Berry Hopson, Lebanon, TN (US); Herve Laurandel, St. Claire (FR); Simon Blair Dobson, Kent (GB); Damien Cabanne, Fountainebleau (FR)

(73) Assignee: Meritor Light Vehicle Systems-France (FR)

( * ) Notice: Subject to any disclaimer, the term of this patent is extended or adjusted under 35 U.S.C. 154(b) by 69 days.

(21) Appl. No.: 10/024,436

(22) Filed: Dec. 18, 2001

(65) Prior Publication Data

US 2002/0095869 A1 Jul. 25, 2002

(30) Foreign Application Priority Data

Dec. 19, 2000 (GB) ................................... 0030894

(51) Int. Cl.⁷ .............................. B60J 5/04; E05F 15/08
(52) U.S. Cl. ........................................ 49/502; 49/349
(58) Field of Search .......................... 49/352, 349, 348, 49/502

(56) References Cited

U.S. PATENT DOCUMENTS 4,058,358 A    11/1977  Carlisle
4,800,648 A  *  1/1989  Nakayama et al. ............ 29/854
4,815,984 A  *  3/1989  Sugiyama et al. ........... 439/211
4,943,109 A      7/1990  Skrbina et al.
5,092,647 A  *  3/1992  Ueda et al. ............... 296/146.9
5,904,002 A  *  5/1999  Emerling et al. ............. 49/502
5,924,872 A      7/1999  Takiguchi et al.
6,185,873 B1 *  2/2001  Saito ........................... 49/502
6,427,386 B1 *  8/2002  Kalb et al. ..................... 49/349

FOREIGN PATENT DOCUMENTS

| DE | 3309149     | 10/1984   |
| EP | 381024      | 1/1990    |
| GB | 2292267     | 2/1996    |
| WO | WO 89/11171 | * 11/1989 |
| WO | WO 98/38057 | * 9/1998  |
| WO | WO 99 11491 | 3/1999    |

OTHER PUBLICATIONS

Search Report Under Section 17 Dated May 30, 2001.

European Search Report dated Dec. 29, 2003.

* cited by examiner

Primary Examiner—Gregory J. Strimbu
(74) Attorney, Agent, or Firm—Carlson, Gaskey & Olds

(57) ABSTRACT

A vehicle door includes a window regulator motor and an inner panel. The window regulator motor further includes a connector housing which houses electrical connector terminals. The connector housing is sealed against the inner panel of the vehicle door via a diaphragm seal.

8 Claims, 2 Drawing Sheets

DIAPHRAGM SEAL FOR SEALING ELECTRICAL CONNECTORS IN A VEHICLE DOOR

BACKGROUND OF THE INVENTION

The present invention relates to vehicle doors, in particular car (automobile) doors.

Known vehicle doors are generally manufactured by securing an inner panel to an outer panel using techniques such as hemming or welding. This provides the structure of the vehicle door, with the upper section of the vehicle door comprising an aperture in which the window glass is housed, and the lower section of the door being used to house additional components such as a window regulator mechanism, which guides and operates the window glass, and a window regulator motor which powers the window regulator mechanism.

It is difficult to form a waterproof seal between the upper edge of the outer panel and the window glass, and consequently water running down the window glass can penetrate this seal and enter the area between the inner panel and the outer panel.

The inner panel defines a barrier between a wet side of the door, outboard of the inner panel, and a dry side of the door, inboard of the inner panel. The inner panel is used to mount the window regulator motor and window regulator mechanism.

Since the window regulator mechanism guides and locates the window glass, known vehicle doors include window regulator mechanisms which are located on the wet side of the door.

The window regulator motor can be located on either the wet or dry side of the door. However since the output shaft of the window regulator motor requires careful alignment with the window regulator mechanism, to achieve this aim it is desirable to locate them both on the same side of the door, and hence locate the window regulator motor on the wet side of the door.

This aids functional alignment, but potentially exposes the window regulator motor and in particular its connector terminals, to moisture. To avoid moisture affecting the motor and terminals considerable sealing is employed, which is costly.

As an alternative, known vehicle doors generally locate the window regulator motor on the dry side of the door to reduce the sealing requirement, but this provides additional alignment problems.

SUMMARY OF THE INVENTION

An object of the present invention is to provide an improved vehicle door in which the connector terminals of the window regulator motor are less prone to be affected by moisture.

Thus, according to the present invention there is provided a vehicle door including a window regulator motor and an inner panel, the window regulator motor including a connector housing, the connector housing including connector terminals, in which the connector housing is sealed against the inner panel via sealing means.

Advantageously this permits both the window regulator mechanism and the window regulator motor to be located on the wet side of the door thus aiding functional alignment and the potential for providing subassemblies of door components prior to assembly of the door.

Advantageously this reduces the degree of sealing required for the window regulator motor.

According to a further aspect of the present invention there is provided a method of assembling a vehicle door comprising, providing a vehicle door with an inner panel, providing a window regulator motor including a connector housing, the connector housing including connector terminals, providing sealing means, providing a harness having a harness connector, assembling the window regulator motor onto the inner panel such that the sealing means seals the connector housing relative to the inner panel, and subsequently connecting the harness connector to the connector terminals.

Advantageously this prevents the connector terminals from being exposed to the wet side of the vehicle door prior to connecting the harness connector.

BRIEF DESCRIPTION OF THE DRAWINGS

The invention will now be described, by way of example only, with reference to the accompanying drawings, in which.

DETAILED DESCRIPTION OF THE DRAWINGS

Figure 1:
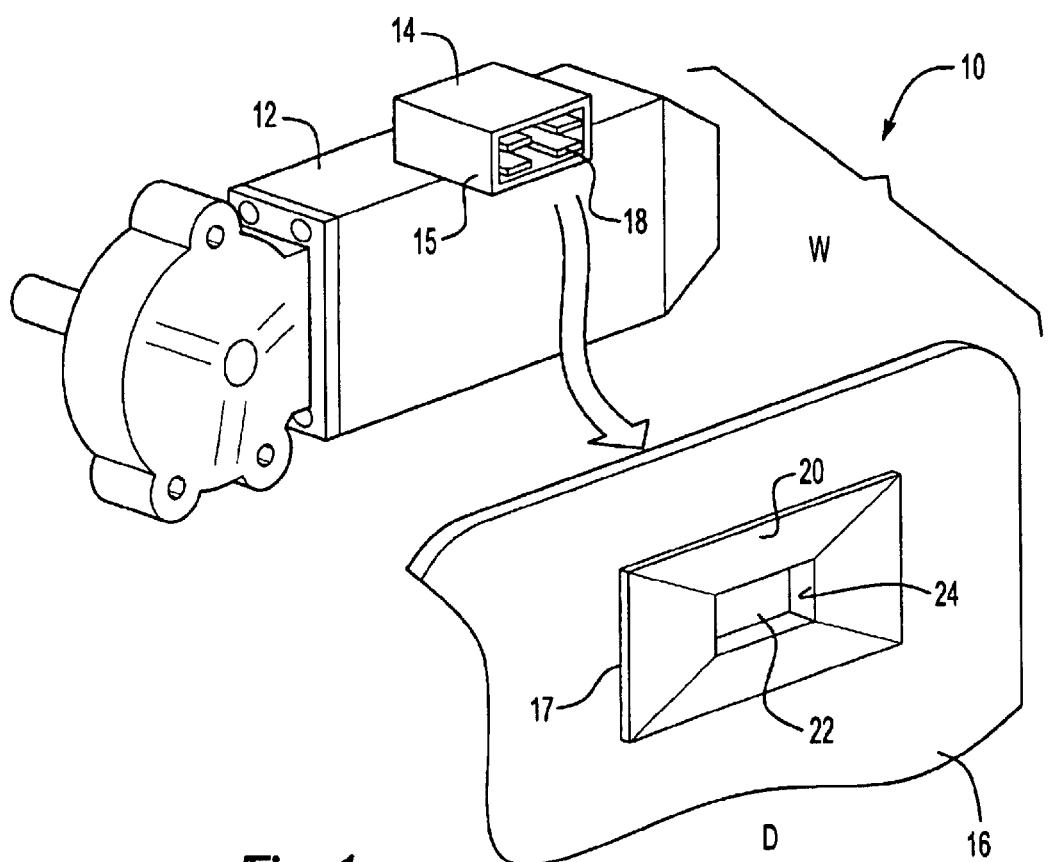
FIG. 1 is a perspective view of a vehicle door according to the present invention.

With reference to FIG. 1 there is shown a window regulator motor 12 and an inner panel 16 of a vehicle door 10 (only part of which is shown), the inner panel 16 defining a barrier between a wet side W of the door and a dry side D of the door. The inner panel 16 can be in the form of a door skin, i.e. a pressed component having various holes and attachments for components such as window regulator components.

Alternatively the inner panel 16 can be in the form of a door module i.e. a panel onto which is pre-mounted various components such as window regulator components, with this pre-assembled door being mounted in a relatively large aperture of a door skin.

Alternatively the door panel 16 can be a panel plate, such as a window regulator mounting plate, onto which parts of a window regulator are mounted.

The window regulator motor 12 includes a connector housing 14 which is rigidly fixed to the window regulator motor 12. The connector housing 14 has an external surface 15. The connector housing 14 includes connector terminals 18.

The inner panel 16 includes a hole 17 in which is secured a sealing means in the form of an elastomeric diaphragm 20, the diaphragm 20 being sealed to the inner panel 16. The diaphragm 20 includes an aperture 22 located at its center, the aperture 22 having an inside peripheral edge 24.

The window regulator motor 12 is secured to the inner panel 16 via fixing means (not shown) such that the connector housing 14 engages with the diaphragm 20 and protrudes through the hole 17 and the aperture 22. The diaphragm 20 is typically of a thickness such that it is displaced as the connector housing 14 protrudes through the aperture 22.

Due to its elastomeric properties the diaphragm 20 deforms and forms a watertight seal between the inside peripheral edge 24 and the external surface 15 of the connector housing 14, directly sealing the connector housing 14 against the diaphragm 20 of the inner panel 16. Thus water is prevented from entering the connector housing 14 and coming into contact with the connecting terminals 18 from the wet side W of the door 10. The connecting terminals 18 are exposed on the dry side D of the vehicle door 10 and ready for connection to a suitable harness connector (not shown).

Figure 2:
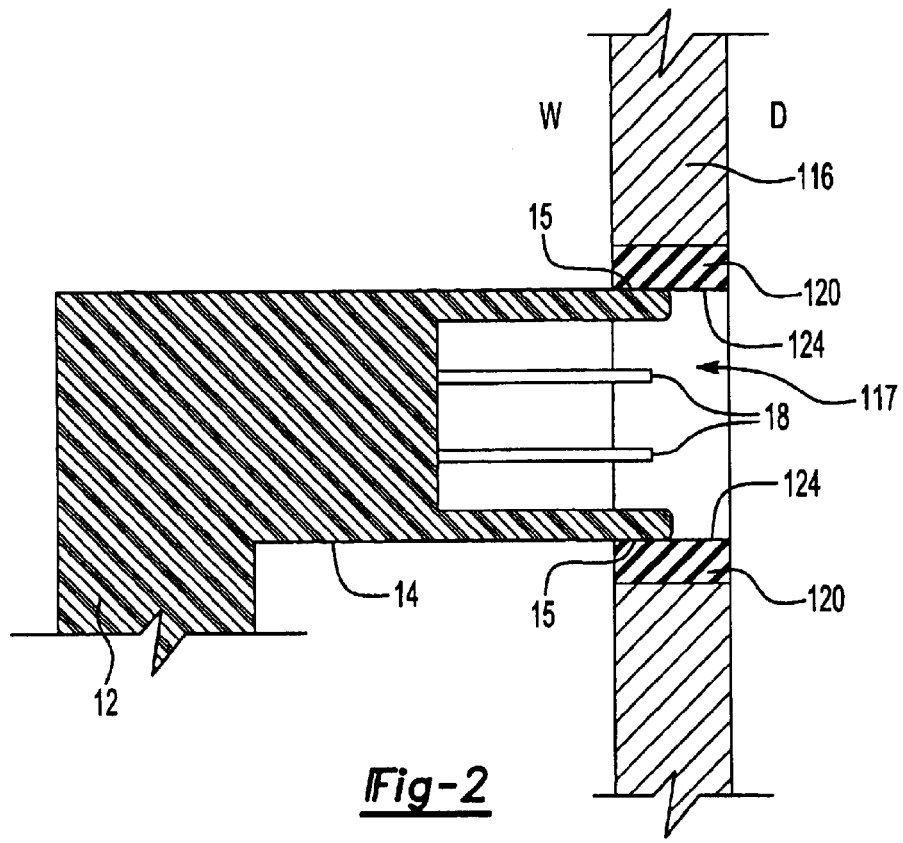
FIG. 2 is a sectional view of an alternative vehicle door according to the present invention.

FIG. 2 shows an alternative embodiment employing different sealing means.

Consideration of FIG. 2 shows the connector housing 14 and an alternative inner panel 116.

The inner panel 116 includes sealing means in the form of a peripheral rubber seal 120. The peripheral rubber seal is located in an aperture 117 of the inner panel 116. The peripheral rubber seal 120 is sealed to the inner panel 116. The rubber seal 120 has an inside peripheral edge 124.

The window regulator motor 12 is secured to the inner panel 116 via fixing means (not shown) such that the connector housing 14 engages with the peripheral rubber seal 120 and partially protrudes through the aperture 117.

The peripheral rubber seal 120 deforms elastically and forms a watertight seal between its inside peripheral edge 124 and the external surface 15 of the connector housing 14, directly sealing the connector housing 14 against the peripheral rubber seal 120 of the inner panel 116. Thus water is prevented from entering the connector housing 14 and coming into contact with the connecting terminals 18 from the wet side W of the door 10. The connecting terminals 18 are exposed on the dry side D of the vehicle door 10 and ready for connection to a suitable wiring harness (not shown).

In other embodiments a connector housing including an elastomeric cover secured on its external surface may be employed. A simple aperture could be provided on an inner panel, with a surface of the elastomeric cover of the connector housing forming a seal against an inside edge of said aperture.

In the above embodiments it can be seen that the sealing means employed forms a peripheral seal between the external surface 15 of the connector housing 14 and the inner panel 16, 116.

Figure 3:
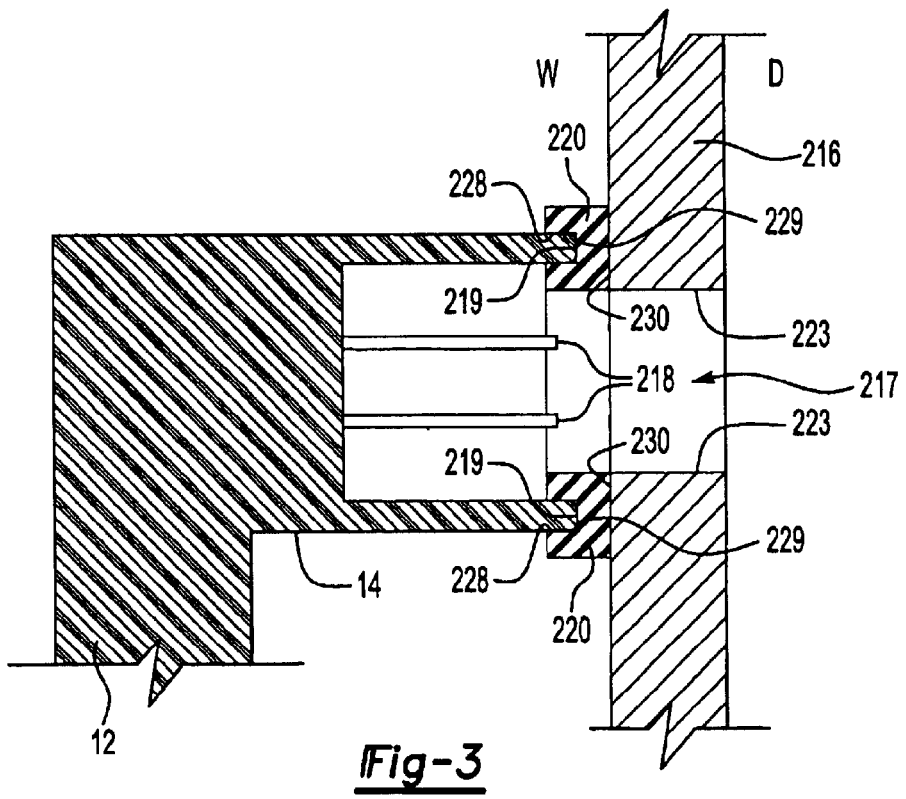
FIG. 3 is a sectional view of another alternative vehicle door according to the present invention.

FIG. 3 shows another alternative embodiment employing different sealing means. Consideration of FIG. 3 shows the connector housing 14, with a housing edge 219 and an inner panel 216. The inner panel 216 has an aperture 217, the aperture 217 being defined by an aperture edge 223. The inner panel has an outer surface 230 located adjacent the aperture edge 223. The inner panel 216 includes sealing means secured thereto in the form of an edge to surface seal 220. The seal 220 is sealed to the outer surface 230 of the inner panel 216. The seal 220 includes a groove 228, the groove 228 including a groove base 229.

The window regulator motor 12 is secured to the inner panel 216 via fixing means (not shown) such that the connector housing 14 engages with the seal 220.

Thus, a watertight seal is formed between the groove base 229 of the seal 220 and the housing edge 219 of the connector housing, directly sealing the connector housing 14 against the seal 220 of the inner panel 216. Thus water is prevented from entering the connector housing 14 and coming into contact with the connecting terminals 18 from the wet side W of the door 10.

The connecting terminals 18 are exposed on the dry side D of the vehicle door 10 and ready for connection to a suitable harness connector (not shown).

In the embodiment shown in FIG. 3 it can be seen that the sealing means employed forms a face to face seal between the external surface 15 of the connector housing 14 and the inner panel 216, as opposed to the peripheral seal formed between the connector housing 14 and the inner panel 16, 116 as shown in the embodiments of FIG. 1 and FIG. 2.

In other embodiments a connector housing including a seal located and secured on its housing edge may be employed to provide an alternative form of face to face seal. This seal would then abut a surface of the inner panel when assembled.

During assembly of a vehicle door according to the above embodiments, it is apparent that the window regulator motor 12 is located onto the inner panel 16,116,216, with sealing means 20,120,220 acting to seal the connector 14 relative to the inner panel 16,116,216 before subsequently connecting a harness connector (not shown) to the connecting terminals 118.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed:

1. A vehicle door module comprising:
an inner panel; and
a window regulator motor including a connector housing, said connector housing including connector terminals, and wherein said connector housing is sealed against said inner panel via a seal mounted on said inner panel, and said seal is a diaphragm
wherein an aperture of said diaphragm includes an inner peripheral edge, and said edge seals against an external surface portion of said connector housing disposed in said aperture of said diaphragm.

2. The vehicle door module according to claim 1 wherein said diaphragm is an elastomeric seal.

3. The vehicle door module according to claim 1 wherein said diaphragm provides a peripheral seal between said connector housing and said inner panel.

4. The vehicle door module according to claim 1 wherein said edge forms a water seal against said external surface portion of said connector housing.

5. The vehicle door module according to claim 1 wherein said diaphragm is a thin membrane.

6. The vehicle door module according to claim 1 wherein said diaphragm is deformable.

7. The vehicle door module according to claim 1 wherein said aperture of said diaphragm is expandable.

8. The vehicle door module according to claim 1 wherein said aperture forms a radial seal along said external surface portion of said connector housing.

* * * * *